United States Patent [19]

Zaltsberg

[11] Patent Number: 4,549,035
[45] Date of Patent: Oct. 22, 1985

[54] AERODYNAMIC DAMPER FOR SUPPRESSING GALLOPING IN OVERHEAD TRANSMISSION LINES

[76] Inventor: Leib Zaltsberg, 6319 N. Sacramento Ave., Chicago, Ill. 60659

[21] Appl. No.: 543,343

[22] Filed: Oct. 19, 1983

[51] Int. Cl.$^4$ ............................................. H02G 7/14
[52] U.S. Cl. ..................................... 174/42; 114/243
[58] Field of Search ................. 174/40 R, 42, 175, 41; 24/129 D, 339, 530, 545, 555; 114/243; 248/74.3

[56] References Cited

U.S. PATENT DOCUMENTS

| | | | |
|---|---|---|---|
| 3,324,853 | 6/1967 | Czorny et al. | 24/545 X |
| 3,461,830 | 8/1969 | Pearce et al. | 114/243 |
| 3,991,550 | 11/1976 | Cohen | 174/42 |
| 3,992,566 | 11/1976 | Kerimov et al. | 174/42 |

FOREIGN PATENT DOCUMENTS

| | | | |
|---|---|---|---|
| 1156864 | 12/1957 | France | 24/339 |
| 2439350 | 5/1980 | France | 248/74.3 |
| 388402 | 6/1965 | Switzerland | 174/41 |
| 950228 | 2/1964 | United Kingdom | 24/339 |

Primary Examiner—Laramie E. Askin
Attorney, Agent, or Firm—Donald P. Reynolds

[57] ABSTRACT

An aerodynamic damper for reducing wind-induced motion, especially galloping, of electrical transmission and distribution lines comprises a structure that in cross-section has a vane that is secured to the conductor by two arms. Each of the arms is formed on the inside partly by an arc of a circle substantially equal in radius to the radius of the circle enclosing the conductor. This arc extends for about 45 degrees on each of the arms. The remaining part, for approximately 90 degrees, of each of the arms is formed by an arc of a circle of a radius smaller than that of the conductor and centered below and off the centerline of the conductor. Each of the arms is terminated by a lip which is thicker than the adjacent portion of the arm. In a preferred embodiment the damper is formed by extending the cross section linearly along the conductor for a distance of the order of four feet. In an alternate embodiment, the damper is formed by winding the cross-section in a helix about the conductor. The damper is preferably made of an insulating plastic such as carbon-filled polyethylene.

15 Claims, 6 Drawing Figures

U.S. Patent  Oct. 22, 1985  4,549,035
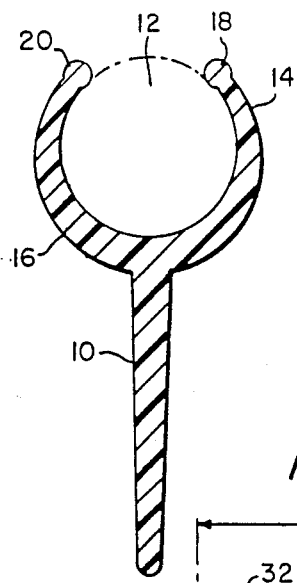
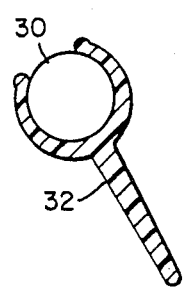
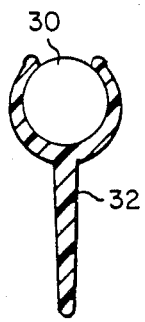
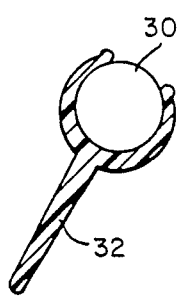
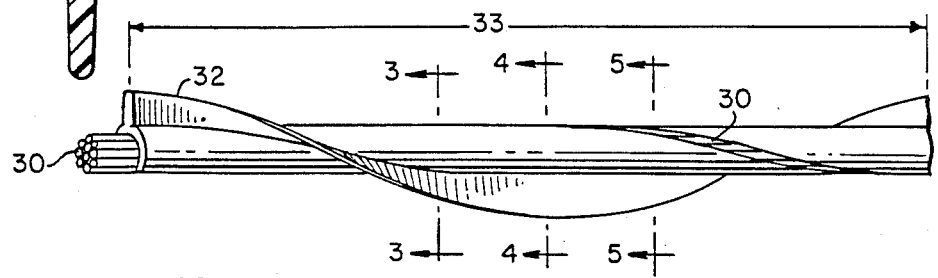
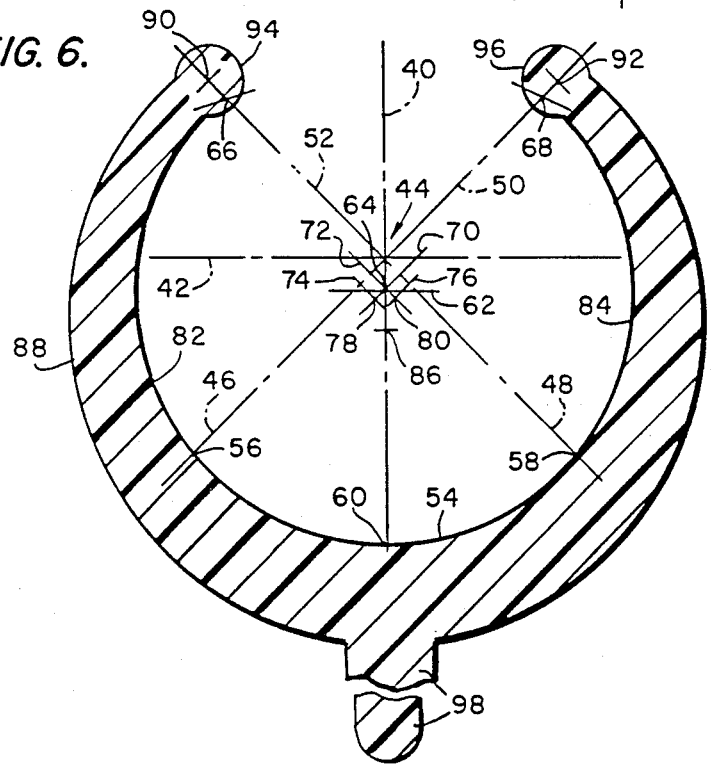

AERODYNAMIC DAMPER FOR SUPPRESSING GALLOPING IN OVERHEAD TRANSMISSION LINES

BACKGROUND OF THE INVENTION

This invention relates to galloping oscillations in transmission and distribution lines. In particular, it is an improved apparatus for suppressing galloping oscillations in aerial transmission and distribution lines.

The term "galloping" is applied to describe a mode of oscillation that has been observed in aerial electrical transmission lines. It is a form of wind-induced motion in which the conductors oscillate vertically. The motion of any particular portion of such a conductor is typically elliptical, with a major axis that is vertical or inclined moderately from the vertical. Looking at a span of a transmission line that exhibits galloping, one typically sees a standing wave with one or two maxima or loops in the span. It is less common to observe three or more loops between adjacent supports or to observe a travelling wave that is reflected at a support, but this has been observed.

The phenomenon of galloping has been analyzed in a classic paper by Den Hartog entitled "Transmission Line Vibration Due to Sleet," AIEE Transactions, Vol. 51, 1932, pp. 1074–6. The analysis of Den Hartog shows that the buildup of ice on one side of a conductor of a transmission line produces an airfoil that is capable of developing lift in response to a component of wind that is perpendicular to the line. Under selected conditions of lift and wind speed, oscillations may develop that build up to peak amplitudes of as much as tens of feet. This may cause line-to-line short circuits, damage to conductors, supports, and associated hardware, or all of these. This analysis is summarized and more recent results are discussed in a book entitled *Transmission Line Reference Book: Wind-Induced Conductor Motion*, Electric Power Research Institute, EPRI Research Project 792, 1979.

A number of mechanisms have been developed to reduce galloping in overhead power transmission lines. One of the first patents that appears to be devoted to the effects of wind on conductors is Dyer, Jr., U.S. Pat. No. 2,321,021, entitled "Composite Electrical Conductor." In that patent it is noted that wind gives rise to excessive transverse vibrations in single-wire conductors. The '021 patent represents an early attempt to shape conductors to reduce the effects of vibrations.

A later attempt at dealing with galloping in transmission lines is Shealy, U.S. Pat. No. 3,659,038, entitled "High-Voltage Vibration Resistant Transmission Line and Conductors Therefor." This patent teaches a composite conductor that is made by wrapping outer wires about a twisted pair of inner cables. The resulting composite conductor is said to resist both aeolian vibration and galloping. Aeolian vibration is wind-induced motion of conductors that is generally higher in frequency and lower in amplitude than galloping.

An early example of an apparatus that is designed to reduce galloping is given in the patent to A. S. Richardson, Jr., U.S. Pat. No. 3,440,328, entitled "Means for Damping Vibrations of Power Transmission Lines." This patent teaches the so-called Richardson damper, or Windamper, a structure designed to be clamped to transmission lines to reduce galloping.

Another structure for dealing with galloping is taught by Liberman in U.S. Pat. No. 3,388,208, entitled "Overhead Transmission Line with Aerodynamic Damper for Suppressing Galloping," which is incorporated here by reference as if set forth fully herein. The structure taught by Liberman is in some ways similar to that of Kerimov and Zaltsberg, U.S. Pat. No. 3,992,566, entitled "Aerodynamic Aerial Conductor Vibration Damper," which is also incorporated by reference as if set forth fully herein. Each of the latter two patents teaches a vane of plastic or the like that is attached vertically to a conductor to change the aerodynamic properties of the conductor, whether or not the conductor has been subject to a buildup of ice.

The aerodynamic dampers of the two latter patents have been shown to be effective in reducing galloping but these are associated with certain disadvantages. The '566 patent teaches an interference fit between the damper and the conductor. Achieving such a fit represents a significant manufacturing complication. Also, installation of the damper of the '566 patent is accomplished by forcing an opening in the upper quadrant of the damper onto a conductor of a transmission line. This frequently results in damaged dampers as the relatively thin edge at the opening of the damper is caught and creased upon insertion.

A further disadvantage of dampers made according to the '566 patent is that these dampers may lack holding power, especially on stranded conductors. This may let the wind twist a damper about the conductor of the transmission line, reducing its effectiveness in damping the aerodynamic forces that lead to galloping. The lack of holding power is increased when any portion of the inside surface of the damper is not in contact with the conductor. This has been observed to occur along the bottom of the conductor.

SUMMARY OF THE INVENTION

It is an object of the present invention to provide an improved aerodynamic damper for aerial lines.

It is a further object of the present invention to provide an aerodynamic damper that grips the conductor better.

It is a further object of the present invention to provide an aerodynamic damper that is easier to install on a transmission line without damaging the damper.

It is a further object of the present invention to provide an aerodynamic damper with better holding power.

These and other objects of the invention are achieved by a structure having cylindrical or helical symmetry and including a straight vane that is intended to project radially from a conductor of a transmission line for a distance of from one-half to five conductor diameters. The vane is secured to the conductor by a clamping portion that is sized to have a diameter substantially equal to that of the conductor over a bottom quadrant. The clamp is completed by portions bounded inside by arcs of reduced diameter with shifted centers that enclose essentially all but one quadrant of the wire. Lips having substantially circular contact portions at the ends of the clamping portions assist in installing the damper on a conductor and in holding the damper in place.

BRIEF DESCRIPTION OF THE DRAWINGS

FIG. 1 is a view of a cross-section of the aerodynamic damper of the present invention.

FIG. 2 is a side view of an alternate embodiment of the aerodynamic damper of the present invention.

FIG. 3 is a cross-sectional view of the structure of FIG. 2 taken along section lines 3—3 of FIG. 2.

FIG. 4 is a sectional view of the structure of FIG. 2 taken along section lines 4—4 of FIG. 2.

FIG. 5 is a sectional view of the structure of FIG. 2 taken along section lines 5—5 of FIG. 2.

FIG. 6 is a constructional layout showing details of the structure of the cross-section of FIG. 1.

DETAILED DESCRIPTION OF THE INVENTION

FIG. 1 is a cross-sectional view of the aerodynamic damper of the present invention. In FIG. 1, a vane 10 extends radially a distance of more than half the diameter of conductor 12, which is taken as the conductor to be protected against wind-induced oscillations. Conductor 12 is typically stranded, in which case the circle shown as conductor 12 is a circle tangent to the outer strands. Vane 10 is attached to conductor 12 by arms 14 and 16 which enclose approximately three-quarters of the circumference of conductor 12. Lip 18 of substantially circular cross section terminates arm 14 and a similar lip 20 terminates arm 16. In a preferred embodiment of the invention, the structure of FIG. 1 is produced from a plastic such as carbon-filled polyethylene in straight sections of the order of several feet in length. Carbon-filled polyethylene is a preferred material, but any insulator having equivalent strength, dimensional stability and resistance to environmental conditions may also be used. These sections are attached to an electrical transmission or distribution line, a telephone cable, or the like, typically at midspan of the line and at one-quarter and three-quarters of the distance between support structures of the line, to cover about one-fourth of the length of the span. This placement will exert a maximum spoiling effect upon oscillations with one and two loops in the span from support to support. This placement and the length covered may vary, depending upon the observed number of loops.

An alternate embodiment of the present invention is shown in FIGS. 2-5 which show respectively a side view of the alternate embodiment and three separate sectional views. In FIG. 2 a conductor 30 is to be protected from wind-induced oscillations by a vane 32 that is secured in a helix about conductor 30. FIG. 2 shows a helix having two complete turns about conductor 30, which is a convenient number of turns for the typical section length of twelve feet or so. Thus, a typical pitch 33 is of the order of six feet. It should be understood that a particular installation may call for one or more sections and for helices of various pitches. This choice is a matter of design selection. FIGS. 3, 4, and 5 show cross sections identical to that of FIG. 1 but rotated to cause vane 32 to form a helix about conductor 30. Such a helix is best formed as a part of the manufacturing process. Vane 32 may project radially from conductor 30 for a distance of as much as one half to five diameters of conductor 30, but typically of the order of one to three conductor diameters. This length and the pitch of the helix of the structure of FIG. 2 are design parameters that may be varied for a particular installation.

FIG. 6 is a constructional drawing showing a method of achieving dimensions and locations of the cross-sections of both embodiments of the present invention. FIG. 6 is constructed about a centerline 40. A perpendicular line 42 intersects centerline 40 at a center 44. Four radial lines 46, 48, 50 and 52 intersect centerline 40 at center 44 and form angles of 45 degrees with it.

Construction of the damper will be defined here in terms of a radius R which is the outer radius of the conductor to be protected. This might also be described as the radius of the smallest circle containing the cross-section of such a conductor, or as the radius of a circle tangent to the strands. The construction of FIG. 6 begins by swinging an arc 54 with radius R, centered at center 44, and extending symmetrically approximately 90 degrees about centerline 40 from radial line 46 to radial line 48. The intersection of arc 54 with radial line 46 defines a point 56 and the intersection of arc 54 with radial line 48 defines a point 58. Point 60 is determined by the intersection of arc 54 with centerline 40.

Other constructional arcs that will be used to lay out the cross-section in FIG. 6 will be based upon a dimension that is reduced from the value of R. For one wire size, that reduced dimension is $r = 0.88 R$. The construction proceeds by swinging an arc 62 to intersect the centerline 40 from point 60 as a center with a radius equal to r. Intersection of arc 62 with centerline 40 gives point 64. From point 64 as a center arc 66 is swung of radius r to intersect radial line 52. Arc 68 is swung from point 64 with radius r to intersect radial line 50. From these intersections arcs 70 and 72 respectively are swung with radius r to intersect centerline 40. Arc 74, of radius r, is swung from point 56 to intersect arc 70 and produce point 78. Arc 76, of radius r, is swung from point 58 to produce point 80 at its intersection with arc 72. Points 78 and 80 are the constructional centers for the rest of the inside surface of FIG. 6. From point 78 an arc 82, of radius r, is swung from point 56 to radial line 52. From point 80 an arc 84 of radius r is swung from point 58 to radial line 50.

The balance of the cross-section of FIG. 6 is created from a point 86 which is located on centerline 40 at a distance a which is of the order of 0.22 R below center 44. This percentage will in general be higher for small cables and lower for large cables. From point 86 an arc 88, of a radius b of approximately 1.14 R, is swung to cover the three quadrants between radial lines 50 and 52. Points 90 and 92 are then taken on radial lines 52 and 50 respectively at a distance midway between the intersections of arcs 82 and 88 on the one hand and 84 and 88 on the other. From points 90 and 92 respectively circles 94 and 96 are constructed having all radii c that are typically of the order of or as small as 50% of the radius of the outer strands of the conductor. Circles 94 and 96 form lips 18 and 20 of FIG. 1, and they serve two functions. First, they facilitate placement of the damper, of which the cross-section is shown in FIG. 6, on a conductor without catching the damper on the conductor and damaging the damper. Second, the lips formed by circles 94 and 96 make contacts with adjacent strands of the conductor at crossings of the strands. This contact helps hold the damper of the present invention in place and increases friction to prevent it from rotation as a result of wind loading. It should be understood that only a small portion of the circumferences of circles 94 and 96 will touch the conductor. For this reason, the portion not touching need not be circular, and may be shaped differently to provide strength upon insertion and to resist twisting. This is a matter of design choice.

Two typical conductors of different sizes are chosen as examples for fixing constructional dimensions in FIG. 6. They are aluminum conductors, steel reinforced (ACSR), described by code words "Linnet" (0.720" in diameter) and "Bluebird" (1.762" in diameter). Values for use in FIG. 6 are listed in the Table.

TABLE

Dimensions in inches for constructing dampers for ACSR conductors.

| Code Word | R | r | a | b | c |
|---|---|---|---|---|---|
| Linnet | 0.360 | 0.317 | 0.075 | 0.409 | 0.043 |
| Bluebird | 0.881 | 0.775 | 0.299 | 1.000 | 0.098 |

A portion of vane 98 is shown in FIG. 6. Vane 98 typically extends radially for more than half of the conductor diameter below arc 88 of FIG. 6. The radial length of vane 98, and the resulting thickness necessary to support it, are selected from a knowledge of the conductor size and the wind conditions to provide an effective damper. Vane 98 is shown in FIG. 6 as being terminated in a semi-circular cross-section, but the object of the invention can be attained equally well with a termination that is rounded or squared-off.

I claim:

1. An aerodynamic damper for damping galloping motion of an aerial electrical conductor comprising:
   (a) an elongated vane having first and second ends, upper and lower surfaces, and first and second sides;
   (b) a first arm connected to the first side of the vane at said upper surface and extending laterally and upwardly of the vane in a first direction, said first arm being arcuate in shape and having an arcuate length about ⅜ of the circumference of a circle of a given diameter;
   (c) a second arm connected to the second side of the vane at said upper surface and extending laterally and upwardly of the vane in a second direction opposite to said first direction, said second arm being arcuate in shape and having an arcuate length about ⅜ of the circumference of said circle of given diameter;
   (d) said first and second arms together with said upper surface having an arcuate length about ¾ of the circumference of said circle of given diameter;
   (e) a first lip of substantially circular cross-section connected to the first arm at an end opposite to the vane and forming an extension of the arc defined by said first arm, the diameter of said first lip being greater than the transverse cross-sectional dimension of said first arm at a location where the first lip is connected to said first arm; and
   (f) a second lip of substantially circular cross-section connected to the second arm at an end opposite to the vane and forming an extension of the arc defined by said second arm, the diameter of said second lip being greater than the transverse cross-sectional dimension of said second arm at a location where the second lip is connected to said second arm.

2. The aerodynamic damper of claim 1 wherein the vane, the first and second arms, and the first and second lips are made of a plastic material.

3. The aerodynamic damper of claim 2 wherein the plastic material is polyethylene containing a filler.

4. The aerodynamic damper of claim 1 wherein the elongated vane has a depth of from one-half to five diameters of the circle of a given diameter.

5. The aerodynamic damper of claim 1 wherein the vane is terminated at said lower surface in a substantially semi-circular cross-section.

6. The aerodynamic damper of claim 1 wherein the vane is terminated at said lower surface in a rounded cross-section.

7. The aerodynamic damper of claim 1 wherein the vane is terminated at said lower surface in a squared-off cross-section.

8. The aerodynamic damper of claim 1 wherein the first and second arms are each bounded internally by a first arc of a circle substantially equal in radius to the radius of the circle of given diameter and extending for an arc length of about 45 degrees from the connections to the first and second sides of the vane, and wherein the first and second arms are each bounded internally by a second arc of a circle of a reduced radius and wherein each of the second arcs is centered equidistant from an end of each of the first arcs and a point or a radius of the circle of given diameter at about 135 degrees to the vane.

9. The aerodynamic damper of claim 8 wherein the vane, the first and second arms, and the first and second lips are made of polyethylene containing a filler.

10. The aerodynamic damper of claim 8 wherein the elongated vane has a depth of from one-half to five diameters of the circle of a given diameter.

11. An aerodynamic damper for damping galloping motion of an aerial electrical conductor comprising a helical structure disposed about an axis, the helical structure having in cross-section the following elements:
    (a) an elongated vane having first and second ends, upper and lower surfaces, and first and second sides;
    (b) a first arm connected to the first side of the vane at said upper surface and extending laterally and upwardly of the vane in a first direction, said first arm being arcuate in shape and having an arcuate length about ⅜ of the circumference of a circle of a given diameter that is centered substantially on said axis;
    (c) a second arm connected to the second side of the vane at said upper surface and extending laterally and upwardly of the vane in a second direction opposite to said first direction, said second arm being arcuate in shape and having an arcuate length about ⅜ of the circumference of said circle of given diameter that is centered substantially on said axis;
    (d) said first and second arms together with said upper surface having an arcuate length about ¾ of the circumference of said circle of given diameter;
    (e) a first lip of substantially circular cross-section connected to the first arm at an end opposite to the vane and forming an extension of the arc defined by said first arm, the diameter of said first lip being greater than the transverse cross-sectional dimension of said first arm at a location where said first lip is connected to said first arm; and
    (f) a second lip of substantially circular cross-section connected to the second arm at an end opposite to the vane and forming an extension of the arc defined by said second arm, the diameter of said second lip being greater than the transverse cross-sectional dimension of said second arm at a location where said second lip is connected to said second arm.

12. The aerodynamic damper of claim 11 wherein the helical structure forms at least one complete turn about the axis.

13. The aerodynamic damper of claim 11 wherein the helical structure is made of a plastic material.

14. The aerodynamic damper of claim 13 wherein the plastic material is polyethylene containing a filler.

15. The aerodynamic damper of claim 11 wherein every point in the cross-section of the damper describes a helix centered substantially on said axis, each such helix extending from said first end of the elongated vane to said second end of the elongated vane.

* * * * *